Feb. 17, 1970   L. GLUCKSTEIN ET AL   3,495,640
FOOD COMMINUTING DEVICES

Filed Aug. 15, 1967   2 Sheets-Sheet 1

INVENTORS
LEONARD GLUCKSTEIN
WILLIAM TOM EVERINGTON
BY PENDLETON, NEUMAN
SEIBOLD & WILLIAMS
ATTORNEYS

Feb. 17, 1970  L. GLUCKSTEIN ET AL  3,495,640
FOOD COMMINUTING DEVICES

Filed Aug. 15, 1967  2 Sheets-Sheet 2

INVENTORS
LEONARD GLUCKSTEIN
WILLIAM TOM EVERINGTON
BY PENDLETON, NEUMAN
SEIBOLD & WILLIAMS
ATTORNEYS

United States Patent Office 3,495,640
Patented Feb. 17, 1970

3,495,640
FOOD COMMINUTING DEVICES
Leonard Gluckstein and William Tom Everington, London, England, assignors to J. Lyons & Company Limited
Filed Aug. 15, 1967, Ser. No. 660,680
Int. Cl. B02c *13/00;* A97j *5/00*
U.S. Cl. 146—106                                 5 Claims

ABSTRACT OF THE DISCLOSURE

In a food comminuting device, a one-piece cutter plate is provided with a number of cutter elements having teeth projecting through openings in the cutter plate, the cutter elements being connected to the cutter plate by means of connectors which both secure the cutter elements to the plate and fix their positions relative to the plate.

---

This invention relates to food comminuting devices and is particularly concerned with improvements to the cutter blades of such devices.

The preparation of beverages from citrous fruits commonly includes as one step the comminution of the appropriately prepared whole fruit by placing the fruit in a receptacle shaped to urge the fruit against a rotating cutter blade by which the fruit is comminuted. Hitherto such cutter blades have comprised members of generally disc-like form pierced by multiple apertures and a part of the margin of each aperture has been formed into a cutter blade raised above the general surface of the disc to engage fruit pressed against the disc and thus to cut thin and narrow portions from the fruit which, by the repeated action of the many blades formed by the disc apertures is rapidly reduced to small fragments. When a cutter blade of the type above described becomes blunted by use, it is necessary to remove the whole disc on which the cutter blades are formed and to replace it by a sharp blade. The working life of the blades is short and the inconvenience of and time consumed in replacing the whole blade unit is considerable.

It is the object of the invention to provide an improved cutter blade for use in food comminuting devices wherein the disadvantages of the known blade units are overcome.

It is a specific object of the invention to provide a food comminuting cutter unit wherein the cutter blades may be replaced by other blades without removing the unit as a whole from the food comminuting device.

It is a further object of the invention to provide a cutter blade for use in food comminuting devices wherein cutting edges are provided on a readily replaceable element which may readily be removed and replaced by another without the necessity of removing the cutter blade unit as a whole from the device of which it forms a part.

Features and advantages of the invention will become apparent from the following description taken in conjunction with the accompanying drawings of which:

Figure 1:
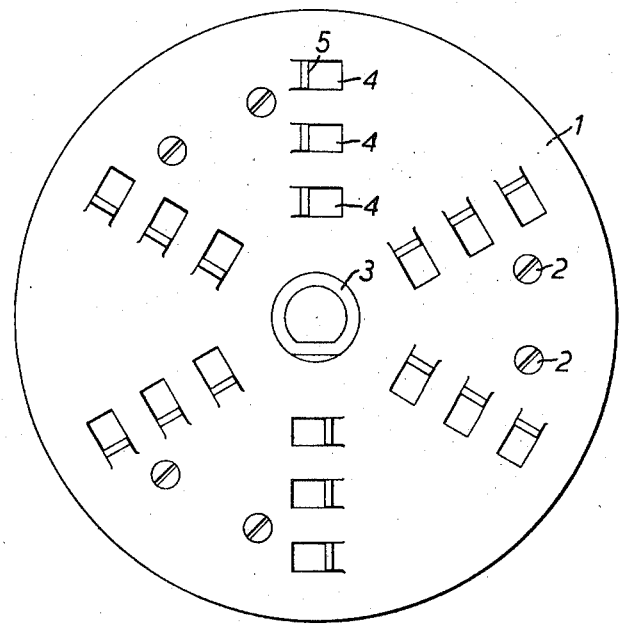
FIGURE 1 is a plan view of a known form of cutter disc unit.
Figure 2:
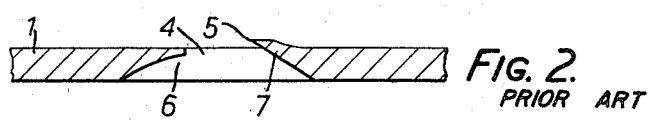
FIGURE 2 is a partial sectional view through the cutter disc unit shown in FIGURE 1.

The cutter disc shown in FIGURES 1 and 2 comprises a circular plate 1 of corrosion-resistant steel secured by means of countersunk screws such as 2 to a three-armed driving spider beneath the disc, of which only the central boss appears at 3.

Plate 1 is pierced by six radial arrays of apertures such as 4, an edge 5 of each aperture being formed into a cutting edge raised above the general level of the plate. As may be seen from FIGURE 2, each of apertures 4 is formed by initially milling a segmental groove 6 in the reverse surface of the cutter plate. The central portion of this groove is then pierced through the plate to form the aperture, and the metal 7 at one side of the aperture is then sheared upwards to form a cutting edge 5, which is ground off parallel to the plate at the required distance above the plate surface. As has already been stated, the working life of such a cutter plate is relatively short, and its cost is appreciable.

Figure 3:
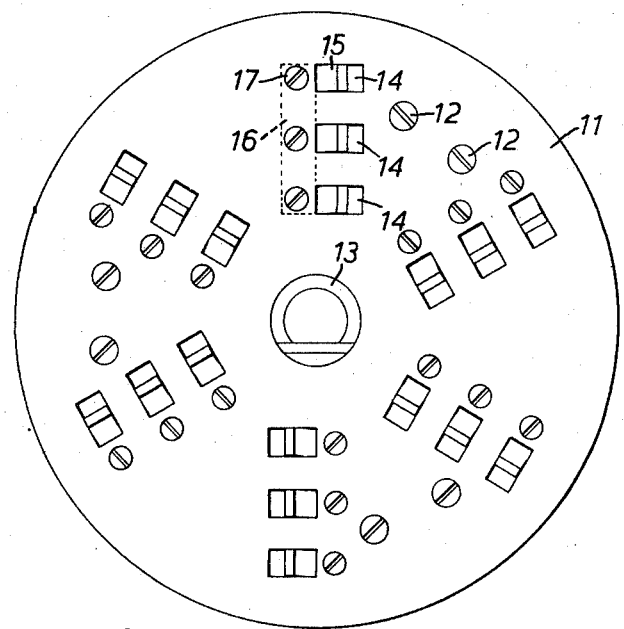
FIGURE 3 is a plan view of a cutter disc assembly incorporating the improvement constituting the present invention.
Figure 4:
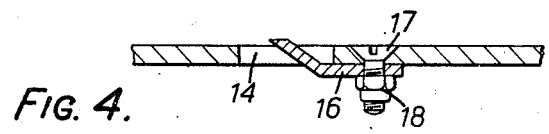
FIGURE 4 is a partial sectional elevation of the disc assembly shown in FIGURE 3.
Figure 5:
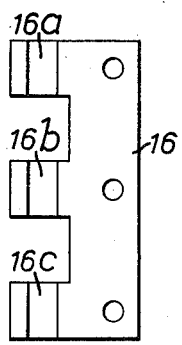
FIGURE 5 is a plan view of a removable cutter element such as is used as a part of the cutter disc assembly described in relation to FIGURES 3 and 4.

FIGURES 3 and 4 shown one form of comminuter cutter blade in accordance with the invention. It again comprises a steel plate 11 secured by countersunk screws such as 12 to a three-armed spider of which the boss only appears at 13. The plate is again pierced by radial arrays of apertures such as 14, which in this case are rectangular holes having their edges perpendicular to the surface of the plate, as best seen in FIGURE 4. The cutting edges 15 are now formed on extensions protruding from a removable cutter member 16 which is secured to the under surface of plate 11 by countersunk screws such as 17 and appropriate secure nuts such as 18. The extensions 16*a*, 16*b* and 16*c* of cutter member 16 are dimensioned to fit closely within the apertures 14 in plate 11.

Not only does this arrangement provide the advantage that when the cutters become blunt it is now unnecessary to remove the whole of the cutter disc from the device of which it forms a part, since the relatively cheap cutter elements 16 may be individually replaced when necessary, but in addition the simple form of the cutter elements permits them to be formed of a more wear-resisting material, such for example as a tungsten steel.

Figure 6:
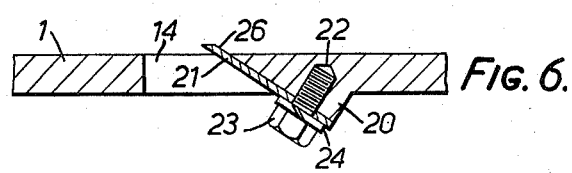
FIGURE 6 shows a partial view of a disc unit assembly including an alternative form of replaceable cutter blade and showing its method of mounting on the disc.

FIGURE 6 shows an alternative form of mounting for a detachable cutter blade. In this case a wedge-shaped protrusion 20 is formed on disc 1 adjacent a sloping marginal surface 21 of the aperture 14 against which a toothed cutter blade element 26, which in this case is of wholly planar form, is held by fastening studs of which one is shown at 22. These studs may be screwed into tapped holes in the wedge-shaped portion of disc 1 and secured by means of a fastening compound such as "Locktite." The blade member is held against the slanting face 21 of the aperture margin by nuts 23 and lock washers 24. It will be understood that the plan view of a cutter disc assembly using the form of blade element mounting shown in and described in relation to FIGURE 6 is exactly as shown in FIGURE 3, save for the absence of the heads of the fastening screws.

We claim:

1. In a cutter blade unit for a food comminuting device having a cutter plate pierced by a plurality of arrays of apertures and a cutter element for each said array, said element having individual tooth portions individually extending through the apertures of said array, the improvement comprising:

a unitary cutter plate
   and a plurality of spaced apart connecting means for securing each said element to said cutter plate, each said connecting means fixing the position of its cutter element relative to said cutter plate.

2. The cutter blade unit as claimed in claim 1, wherein said cutter element comprises a flat generally rectangular plate portion having tooth portions projecting from a single edge thereof to pass through said apertures.

3. The cutter blade unit as claimed in claim 1, wherein said tooth portions of said cutter element are bent at an angle to the plate portion thereof.

4. The cutter blade unit as claimed in claim 1 wherein each said array of apertures comprises three apertures and said cutter elements are of generally E-shaped form.

5. The cutter blade unit as claimed in claim 1 wherein each said aperture of a said array has a margin surface inclined to the surface of said disc, said inclined margin surfaces of said array of apertures defining a common plane, wherein said cutter plate has a wedge-shaped projection thereon adjacent said array of apertures, said projection presenting a slant surface coplanar with said inclined aperture margin surfaces, wherein said cutter element comprises a generally rectangular flat plate portion having individual spaced coplanar tooth portions projecting from an edge thereof, and wherein said connecting means secure said cutter element on said slant surface with said tooth portions projecting through said apertures and disposed against said inclined margin surfaces thereof.

References Cited
UNITED STATES PATENTS

| | | | |
|---|---|---|---|
| 887,205 | 5/1908 | Locke | 146—124 |
| 2,852,201 | 9/1958 | Bert | 146—125 X |
| 2,856,976 | 10/1958 | MacDougall | 146—125 X |

W. GRAYDON ABERCROMBIE, Primary Examiner

U.S. Cl. X.R.

146—124